United States Patent [19]

Jacobson

[11] 4,367,552
[45] Jan. 4, 1983

[54] DUAL WAVELENGTH INFRARED LASER
[75] Inventor: Thor V. Jacobson, Ste. Foy, Canada
[73] Assignee: Her Majesty the Queen in right of Canada, Canada
[21] Appl. No.: 176,805
[22] Filed: Aug. 11, 1980
[51] Int. Cl.³ ............................................... H01S 3/23
[52] U.S. Cl. ........................................ 372/23; 372/69; 372/92; 372/25
[58] Field of Search ...................... 331/94.5 G, 94.5 P, 331/94.5 PE, 94.5 S

[56] References Cited
U.S. PATENT DOCUMENTS
4,145,668  3/1979  Mastrop et al. ................ 331/94.5 P
4,168,474  9/1979  Pleasance ....................... 331/94.5 G OTHER PUBLICATIONS
"DF-$CO_2$ Chemical Quantum Amplifer with High Performance Characteristics", Basov et al. Sov. J. Quantum Electron., vol. 6, No. 9 (Sep. 1976).
"Operating Characteristics of a Transverse Flow DF–$CO_2$ Purely Chemical Laser"; Cool et al.; App. Physics. Left., vol. 17, No. 7 (Oct. 1970) pp. 278–281.
"An Efficient Large Volume DF/$CO_2$ Chemical Laser System"; Parker et al. 1973 Conf. Inter. Electron. Devices Meeting Technical Digest (3–5 Dec. 1973).
"Single Longitudinal Mode Operation of High Pressure Pulsed $CO_2$ Lasers"; Holzhover et al.; Phys. Lett., vol. 46A, No. 3 (1973) pp. 229–230.

Primary Examiner—William L. Sikes
Assistant Examiner—Léon Scott, Jr
Attorney, Agent, or Firm—Stevens, Davis, Miller & Mosher

[57] ABSTRACT

The invention disclosed is a dual wavelength output laser for use in laser rangefinders. Two different laser active media, e.g. $CO_2$ and DF, are operated in separate laser cavities arranged in tandem in the same optical resonant cavity, resulting in a co-linear dual wavelength laser output.

6 Claims, 2 Drawing Figures

DUAL WAVELENGTH INFRARED LASER

BACKGROUND OF THE INVENTION

1. Field of the Invention

This invention relates to laser range finders and in particular to a multiple wave length laser source for use therein. Laser rangefinders exist that operate in both the 3-5 μm atmospheric window (DF at 3.8 μm) and the 8-13 μm window ($CO_2$ at 10.6 μm). At sea level, variations in the attenuation of radiation in the 8-13 μm band are due to variations in the amount of atmospheric water vapor, because of a water vapor continuum absorption located in this spectral region. Variations in the attenuation of the 3-5 μm band are primarily due to changes in the aerosol concentration in the atmosphere i.e. visibility changes; the longer wavelengths of the 8-13 μm band are less affected by aerosol scattering losses.

A major design consideration for a laser radar is the selection of the operating wavelength. Both the $CO_2$ and DF laser wavelengths lie in the "eye-safe" region, so that differences in their atmospheric propagation properties under envisioned operating conditions of the laser rangefinder should decide the optimum operating wavelength. For maximum flexibility, both laser wavelengths should be incorporated into the transmitter. If two independent wavelength laser devices are used, however, problems in optical alignment of components which can be opaque to visible radiation are encountered. Furthermore, complex beam-mixing optics would not be as rugged as a single cavity system under field conditions. It is evident that a considerable reduction in system complexity is possible if the two lasers can be operated in the same optical cavity.

2. Description of the Prior Art

In U.S. Pat. No. 3,548,212 which issued Dec. 15, 1970, Whetter describes a multi beam laser tracking system in which laser beams of different wavelengths and from different optical cavities are employed. The lasers appear to share a common back mirror, although they use separate portions of that mirror, while the output mirrors are the partially reflecting ends of the crystals. It is noted that the laser beams are not combined into a common beam, but instead are directed forward to a common target at a known distance from the source.

In U.S. Pat. Nos. 3,437,820 which issued Apr. 8, 1969 to Thompson et al and 3,549,256 which issued Dec. 22, 1970 to Brienza et al, optical rangefinders are described in which a single output beam is produced by combining the two beams from different optical cavities with a dichroic mirror. Such devices require careful alignment of steering mirrors to ensure that the direction of propagation of the two different wavelength laser beams is the same.

SUMMARY OF THE INVENTION

Applicant has now discovered that if two lasers operating on different wavelengths that lie in spectral regions with low molecular absorption by atmospheric gases and disposed in tandem in the same optical cavity may be operated in that cavity, resulting in a co-linear laser output which is a mixture of the two laser beams.

Thus, according to the invention, a dual wavelength laser source is contemplated, comprising optical cavity means including totally reflecting mirror means and partially transmitting mirror means; two pulsed laser means having different wave length outputs disposed in tandem in said optical cavity; timing circuit means simultaneously creating laser pulses from said laser means; so constructed and arranged such that laser pulses from said two laser means are received by said totally reflecting mirror means and are directed to said partially transmitting mirror means to transmit a co-linear laser output which is a mixture of said two laser beams and which has two different wavelengths.

DESCRIPTION OF THE PREFERRED EMBODIMENT

Figure 1:
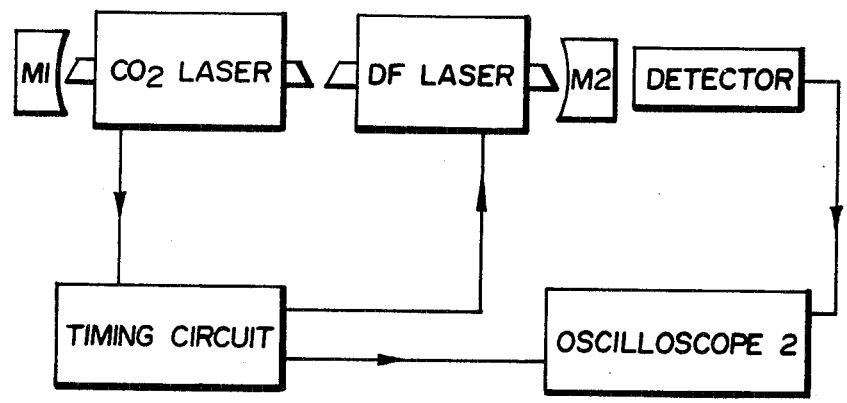
FIG. 1 is a schematic diagram of an experimental set-up used to confirm the operation of the dual wavelength laser source according to the invention.

With reference to FIG. 1, it will be seen that a pulsed $CO_2$ laser, conveniently a Tachisto TAC II discharge module was used for the $CO_2$ laser discharge, and a pulsed DF laser, conveniently a Lumonics TE 211 module was used for the DF laser discharge. These modules (laser cavities) were placed in tandem and aligned along the longitudinal axis of reflection of an optical resonant cavity formed by a totally reflecting gold-coated mirror M1 with a radius of curvature of 10 m (M1), and an output mirror M2 which is partially transmitting at $CO_2$ and DF wavelengths, also with a 10 m radius of curvature. The selection of radii of curvature of the cavity mirrors is governed by laws for "stable" cavities as defined in "Laser Beams and Resonators" H. Kogelnick and T. Li., Applied Optics Vol. 5, No. 10, pp. 1550-1567 (1966), or "unstable" cavities as defined in "Unstable Optical Resonators" A. D. Siegman, Applied Optics Vol. 13, No. 2, pp. 353-367 (1974).

The reflectivity of the output mirror (M2) should be sufficiently high near 3.8 μm and at 9.6 μm to permit lasing at these wavelengths. The distance between the mirrors was 2.5 m. The $CO_2$ laser was free running at a repetition rate of 0.5 Hz. Trigger pulses from the $CO_2$ module were used to trigger a timing circuit, conveniently oscilloscope 1. It will be appreciated that any conventional timing circuit which generates a suitable fixed delay may be employed. The delayed oscilloscope trigger of oscilloscope 1 was used as a trigger pulse of variable delay to trigger the DF module so that the laser pulses occurred simultaneously. The direct oscilloscope trigger of oscilloscope 1 was used to trigger oscilloscope 2 that sampled the laser output via the detector.

The detector represents three detectors, used one at a time, to sample the output from mirror M2, depending upon the measurement being performed.

(a) For the measurement of laser pulse energies, a pyroelectric joulemeter is used e.g. a Gen Tec Model ED-200
(b) For the determination of the DF laser pulse shape; an indium antimodide (InSb) detector cooled to 77° K. with liquid nitrogen was employed.
(c) For the determination of the $CO_2$ laser pulse shape, a photon drag germanium detector operating at room temperature was employed.

More specifically, in operation, the $CO_2$ laser (TAC2) and the DF laser (TE211) are pulsed lasers. The $CO_2$ laser was used in the internal trigger mode, with a repetition rate selected by the operator. If both laser discharges were produced simultaneously, the $CO_2$ laser pulse would appear later than the DF laser pulse, due to the nature of the molecules involved. Hence, a delay between the initiation of the $CO_2$ laser discharge and the DF laser discharge is introduced. This delay was produced by connecting the synch pulse from the $CO_2$ laser to oscilloscope 1, and then triggering the DF laser discharge with the delayed trigger output of oscilloscope 1. The operator has control of the delay of this pulse after the initiation of the oscilloscope trace. In a complete cycle, both the $CO_2$ and DF lasers are fired once each, the $CO_2$ laser before the DF laser, with the delay set to permit the $CO_2$ and DF laser pulses to be emitted simultaneously. In addition oscilloscope 1 is connected to a oscilloscope 2 which responds to the signal developed by the detector.

Figure 2:
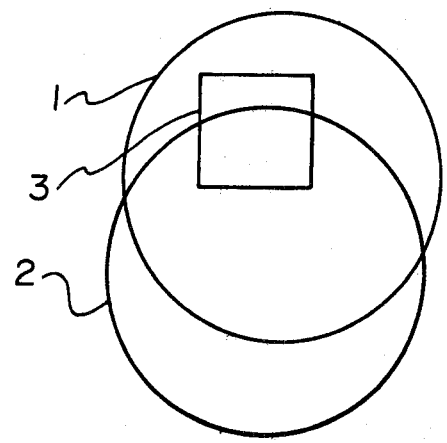
FIG. 2 is a theoretical illustration relating to target ranging.

As discussed briefly above, the two laser beams must be colinear in order that the same target will be intercepted by the two beams or that the two lasers sample the same volume in space. Even a small angular misalignment is detrimental to the obtaining of optimum results, as ranges of several kilometers are frequently encountered. FIG. 2 illustrates an instance in which a small target 3 will give unequal response for the two wavelengths, due to misalignment; laser 1 fills the target entirely, while laser 2 only partially fills it. For example, for a target range of 5 kms, and with lasers whose beams have a divergence of 0.5 mR (a reasonable value), the two beams could not intercept a target 5 m in diameter if the beams were misaligned by as little as 1 mR; this misalignment is very slight, and difficult to detect or correct for, when one has to align steering mirrors and a dichroic mirror in accordance with prior art devices. Furthermore, this alignment tolerance must be maintained under field conditions.

By placing the active media in the same optical resonant cavity, only one set of resonator mirrors is required, and no alignment involving a dichroic mirror is necessary. Instead, the optical resonant cavity forces the two beams to be colinear, so that the alignment problems are solved automatically. If there are any beam steering effects, both beams are affected equally, and the laser beams remain colinear. Thus, this arrangement is much more stable for field use.

The following experiments were performed to confirm the operational characteristics of the dual wavelength laser source according to the invention.

Laser Output Energy

Most experiments were carried out in a cavity whose output mirror had a reflectivity of 90% at 9.6 and 10.6 $\mu m$, and 75 to 80% near 3.8 $\mu m$. In the present case, a $CO_2$ laser and a DF laser were placed in the same optical resonant cavity. It is known that the $SF_6$, necessary for the DF laser, inhibits the $CO_2$ laser from operating on the normal transition at 10.6 $\mu m$, but does not affect the $CO_2$ laser performance as the output wavelength is shifted to 9.6 $\mu m$. This wavelength has nearly the same atmospheric absorption characteristics as the conventional 10.6 $\mu m$ wavelength radiation. By itself, the $CO_2$ module produced 250 mJ of laser energy at 10.6 $\mu m$ with a gas mix of $CO_2:N_2:He$ in a ratio of about 2:1:5 at a total pressure of 107 kPa. When 9 kPa of $SF_6$ and $D_2$ in a ratio of 10:1 were introduced into the DF module, the $CO_2$ laser output shifted to the P(22) transition of the $00°1-02°0$ manifold at a wavelength of 9.6 $\mu m$; the $CO_2$ laser energy was unchanged with this wavelength shift. The DF laser module produced 15 mJ of laser radiation near 3.8 $\mu m$; subsequent experiments demonstrated that the DF laser output was severly limited by aperturing by the $CO_2$ module and that there was no absorption of DF radiation by the $CO_2$ molecules. The DF module is capable of producing 150 mJ of laser energy when the $CO_2$ laser module was removed from the optical cavity. When the output mirror M2 was a mirror reflecting 50% at 3.8 $\mu m$ and only 70% at 9.6 $\mu m$, the $CO_2$ laser did not operate while the DF laser output increased to 25 mJ with this mirror, indicating that the output mirror reflectivity must be chosen to optimize both lasers.

Mention has been made of pulse energies and operating pressures, but only to ensure that the presence of one laser medium does not influence the performance of the other laser. The only effect noted was to cause the $CO_2$ laser to operate on the $00°1$ to $02°0$ transition instead of the normal $00°1$ to $10°0$ transition, resulting in a wavelength shift from 10.6 $\mu m$ to 9.6 $\mu m$.

Spectral Content of DF Laser

Table I lists the DF lasing transitions that were observed when a 10/1 mixture of $SF_6/D_2$ was excited at a pressure of 9 kPa; the weak and strong transitions are identified in the table. The observed transitions were noted both with and without the $CO_2$ laser in operation.

TABLE I

| Observed DF Laser Transitions | | |
|---|---|---|
| Transition | λ ($\mu m$) | Comments |
| $P_1(5)$ | 3.581 | Strong |
| $P_1(6)$ | 3.612 | Weak |
| $P_2(4)$ | 3.667 | Weak |
| $P_2(5)$ | 3.698 | Strong |
| $P_2(6)$ | 3.731 | Weak |
| $P_3(5)$ | 3.821 | Strong |
| $P_3(6)$ | 3.855 | Strong |
| $P_4(3)$ | 3.882 | Weak |
| $P_3(7)$ | 3.890 | Weak |

*$P_v(J)$: transition $v, J \rightarrow v - 1, J + 1$

The transitions listed in table I correspond to DF molecular transitions. These lines were observed both when the $CO_2$ laser contained no $CO_2$ and when the $CO_2$ laser was operational. The significance of this result is that the $CO_2$ laser does not affect the performance of the DF laser.

Temporal Features

The shape of the 9.6 $\mu m$ pulses was observed on oscilloscope 2 in response to a signal received from the Photon drag detector. It was similar to the 10.6 $\mu m$ pulses produced when $SF_6$ was not present in the cavity. This is not surprising as the two transitions have the $00°1$ upper level in common. The shape of the 3.8 $\mu m$ DF laser pulse was also observed. The 9.6 $\mu m$ $CO_2$ laser appears to be partially mode locked, while the shape of the DF pulse is determined by the cascading that characterizes multilevel systems; both pulses appear to be approximately 500 ns in duration. When the two laser pulses were produced simultaneously, there was no detectable change in the pulse shapes. In this experiment, the DF laser discharge was delayed with respect to the $CO_2$ laser discharge, because of the longer cavity build-up time for the $CO_2$ laser pulse. It was also noted that the cavity build-up time of the 9.56 $\mu m$ transition was 500 ns longer than was the case for the 10.6 $\mu m$ pulse; this longer cavity build-up time for the 9.6 μm laser pulse is due to the reduced gain on this transition relative to that of the 10.6 μm transition when no $SF_6$ is present.

Beam Divergence

An estimate of the divergence of the $CO_2$ laser was made by measuring the burn size made by the beam as it is focussed onto a piece of exposed Polaroid ® film. The size of the burn pattern was not altered when the DF laser was operated with the 9.6 μm $CO_2$ laser. The measurement indicated a beam divergence of approximately 0.6 mrad.

From the above experiments it is apparent that the output mirror reflectivity is ideally about 50% at 3.8 μm and 90% at 9.6 μm to optimize the transmission of both wavelengths.

Atmospheric Transmission Considerations

According to the latest in formation available e.g. McClatchey, R. A. and Selby, J. E., "Atmospheric Attenuation of Laser Radiation from 0.76 to 31.25 microns", AFCRL-TR-74-0003, it is apparent that a $CO_2$ laser transmits through the atmosphere just as well at wavelength of 9.6 μm and 10.6 μm for all practical purposes. Accordingly, the shift in operating wavelength of the $CO_2$ laser from the 10.6 μm to 9.6 μm in no way reduces the potential effectiveness of the $CO_2$ laser for use as a range finder.

The invention has been described in relation to a $CO_2$ laser which operates in the 8 to 13 micron window and a DF laser which operates in the 3 to 5 micron window. Although only the $DF/CO_2$ combination is described, these two lasers are the most important gas lasers operating in the above mentioned spectral windows. Accordingly, no further examples of combinations of lasers for rangefinding applications are needed.

The embodiments of the invention in which an exclusive property or privilege is claimed are defined as follows:

1. A dual wavelength output laser, comprising
   an optical resonant cavity including a totally reflecting mirror at one end of said cavity and a partially transmitting output mirror at an opposite end of said cavity, said totally reflecting mirror and said partially transmitting mirror being spaced apart and defining an axis of reflection between them;
   first and second laser cavities disposed in tandem in said optical resonant cavity and aligned along said axis of reflection to reflect laser radiation between said totally reflecting mirror and said partially transmitting output mirror along said axis of reflection through said first and second laser cavities;
   first and second laser active media disposed in said first and second laser cavities, respectively, said first laser active media producing a laser discharge at a first wavelength, said second laser active media producing a laser discharge at a second wavelength; and
   timing circuit means for causing simultaneous laser discharges from said first and second active media, such that a co-linear dual wavelength laser output is provided through said partially transmitting output mirror.

2. A dual wavelength laser according to claim 1, wherein said first and second active media are $CO_2$ and $DF_2$, respectively.

3. A dual wavelength laser according to claim 2, wherein said first active media has an operating wavelength of about 8–13 μm and said second active media has an operating wavelength of about 3–5 μm.

4. A dual wavelength laser according to claim 3, wherein the first active media is $CO_2$ which has an operating wavelength of about 10.6 μm and a gas mixture of $CO_2:N_2:He$ in a ratio of about 2:1:5 and the second active media is DF which has an operating wavelength of about 3.8 μm and a gas mixture of $SF_6:D_2$ in a ratio of about 10:1.

5. A dual wavelength laser according to claim 3, wherein the partially transmitting mirror has a reflectivity of about 90% at 9.56 μm and 50% at 3.8 μm to permit lasing at these wavelengths and to transmit said co-linear dual wavelength laser output.

6. A dual wavelength laser according to claim 2, 3, 4 or 5, wherein said timing circuit means provides a variable delay between initiation of the $CO_2$ discharge and initiation of the DF discharge so that the $CO_2$ and DF active media pulse simultaneously.

* * * * *